United States Patent
Hekstra et al.

(10) Patent No.: US 7,430,022 B2
(45) Date of Patent: Sep. 30, 2008

(54) COLOR DISPLAY DEVICE

(75) Inventors: Gerben Johan Hekstra, Eindhoven (NL); Hugo Johan Cornelissen, Eindhoven (NL); Dirk Kornelis Gerhardus De Boer, Eindhoven (NL); Dirk Jan Broer, Eindhoven (NL); Martin Jacobus Johan Jak, Eindhoven (NL); Erno Hermanus Antonius Langendijk, Eindhoven (NL); Leo Jan Velthoven, Eindhoven (NL); Michiel Adriaanszoon Klompenhouwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 492 days.

(21) Appl. No.: 10/529,669

(22) PCT Filed: Sep. 30, 2003

(86) PCT No.: PCT/IB03/04300

§ 371 (c)(1),
(2), (4) Date: Mar. 29, 2005

(87) PCT Pub. No.: WO2004/032523

PCT Pub. Date: Apr. 15, 2004

(65) Prior Publication Data

US 2007/0146509 A1   Jun. 28, 2007

(51) Int. Cl.
H04N 9/31 (2006.01)
H04N 9/64 (2006.01)

(52) U.S. Cl. ............... 348/743; 348/742; 348/760; 348/744; 345/83; 345/84; 353/84

(58) Field of Classification Search ............. 348/742, 348/743, 760, 744, 758, 759; 353/84, 85; 345/72, 83, 84, 48
See application file for complete search history.

(56) References Cited

U.S. PATENT DOCUMENTS

| | | | |
|---|---|---|---|
| 5,428,408 A | 6/1995 | Stanton | |
| 5,668,611 A | 9/1997 | Ernstoff et al. | |
| 6,147,720 A * | 11/2000 | Guerinot et al. | 348/744 |
| 6,252,636 B1 * | 6/2001 | Bartlett | 348/743 |
| 6,469,821 B2 * | 10/2002 | Bartlett et al. | 359/292 |
| 6,505,939 B1 * | 1/2003 | Bierhuizen et al. | 353/94 |
| 6,545,814 B2 * | 4/2003 | Bartlett et al. | 359/636 |
| 6,758,579 B2 * | 7/2004 | Ishikawa et al. | 362/238 |
| 6,972,736 B1 * | 12/2005 | Wada et al. | 345/32 |
| 7,053,880 B2 * | 5/2006 | Lim et al. | 345/102 |
| 7,180,554 B2 * | 2/2007 | Divelbiss et al. | 348/742 |
| 2002/0057253 A1 | 5/2002 | Lim et al. | |

FOREIGN PATENT DOCUMENTS

EP   0 865 210   9/1998

* cited by examiner

*Primary Examiner*—David Ometz
*Assistant Examiner*—Jean W Désir (57) ABSTRACT

The invention relates to a color display device for display a color image and a method of operating such display. The color display device is provided with a plurality of picture elements, two selectable light sources having different predetermined radiance spectra, color selection means which in combination with the selectable light sources is able to produce respective first and second primary colors on the display panel and control means arranged to select alternately one of the selectable light sources and to provide a portion of the picture elements with image information corresponding to the respective primary colors obtainable with the selected light source. The primary colors of the display device can be selected in a time sequential and space sequential way which enable a reduction of a color break-up.

16 Claims, 12 Drawing Sheets

COLOR DISPLAY DEVICE

The invention relates to a color display device and a method of operating such device.

Color display devices are well known and are used in, for example, televisions, monitors, laptop computers, mobile phones, personal digital assistants (PDA's) and electronic books.

A color display device is described in International patent application WO 01/95544. This application describes a projection system for displaying an expanded gamut of colors spawn by six primary colors. The projection system is provided with a single light source and six color filters arranged on subsequent segments of a annular rotable wheel which provide in combination with light source six primary colors red,green,blue, cyan, magenta and yellow. This arrangement provides a colored lightbeam and illuminates a reflective digital mirrored display (DMD). The DMD panel modulates the lightbeam with image information corresponding to the actual color of the lightbeam. A projection lens can project the modulated lightbeam on a projection screen. The image information for the six primary colors is derived from red, green and blue signals from a video source in accordance with a method which is also described in the cited patent application WO 01/95544. A drawback of this display that color break-up may occur in case images with fast moving objects having a high brightness are displayed.

A transmissive LCD display device for operation with a color sequential backlight is described in the international patent application WO 02/052537. Although, this display device is not a wide color gamut display device but has similar drawbacks as a reflective display panel applied in a projection system. An advantage of these systems is that is that color filters are not needed reducing cost and improving brightness. Moreover, a pixel consists of only one single sub-pixel, transmitting the colors in sequence. This also enhances brightness, due to a higher pixel aperture because only a single thin-film-transistor (TFT) is applied per pixel, instead of the application of three TFT's for a RGB display panel.

It is an object of the invention to provide a color display device in which color break-up can be reduced. This object is achieved by a display device according to the invention as specified in claim 1. The insight of the invention is that in case the display panel is sequentially illuminated by the selected light source with their associated spectra and color filters are used to select predetermined parts of the spectra to obtain a primary color of the display device, the driving of the display and/or the light sources can be adapted such that a perceived difference in luminance and/or chrominance of subsequent image subframes is minimized and color break-up can be reduced.

Color break-up may occur for color sequential displays wherein distinct primary colors are sequenced. When a image showing a moving object with a bright, unsaturated, colour is displayed, colored contours become visible to the observer due to the time sequence of the primary colors. For example, in case an image with a bright, white object having equal and large contributions of primary colors is displayed, the eye of an observer tracks the motion of the object and the contributions of the primary colors are not compensated for the instance at which they are displayed and hence these contributions become separately visible.

A further object of the invention is provide a method of operating color displays in which color break-up can be reduced. This object is achieved by a method according to the invention as specified in claim 17.

Advantageous embodiments of the invention are specified in the dependent claims.

These and other aspects of the invention are apparent from and will be elucidated with reference to the embodiments described hereinafter.

A projection system is described in the cited patent application WO01/95544.

The projection system comprises a digital mirrored display (DMD) panel with colour sequential operation, wherein multiple primary colors are sequenced with a colour wheel rotatable by a motor. The disadvantages of this display device are:

A high (sub) frame rate is required for a proper operation. All of the primary colors (one primary color per sub-frame) have to be shown in a conventional frame period of 20 ms for a 50 Hz display frequency and 16.7 ms for a 60 Hz display frequency. For a conventional RGB operation, the currently used frame rate is in that case close to 150/180 Hz. For more than three primary colors, this type of sequential operation requires even faster panels than the frame rate of 150/180 Hz.

Furthermore, colour break-up occurs for this type of colour sequential operation. For images having a high brightness and showing fast moving objects, the contributions of the different primary colors are visible as contours. Moreover, the colour wheel design is more complex, and requires more colour filters.

Figure 1:
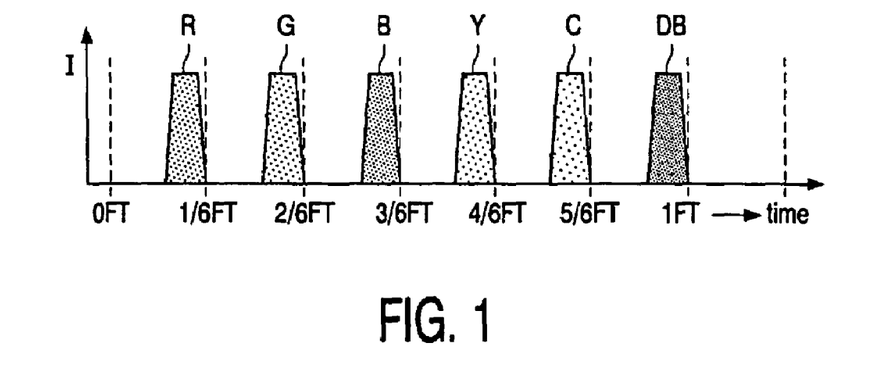
FIG. 1 shows the color sequential operation of a display device.

FIG. 1 shows a diagram of the operation of a conventional color sequential transmissive LCD display device expanded to six primary colours red R, green G, blue B, yellow Y, cyan C and dark blue DB A drawback of this arrangement is that a frame representing an image has to be split in 6 subframes corresponding to the six primary colors and display panel has to be provided with image information corresponding to the primary colors, which requires a high data rate and a fast response LCD panel. In order to mitigate this drawback, a transmissive or reflective display device is provided with spatial-temporal selection of primary colours. Thereto, the display device is sequentially illuminated by a set of light sources able to emit light with different spectra. Colour filters and/or optical guides can be used to select those parts of the spectra that form a primary colour of the display device. The light valves of the display device are driven in correspondence with the primary color generated via the selected light source in combination with the color filter and/or light gudies to give the proper weighting to each of the primary colors to form an image. The colour break-up phenomenon is avoided through proper choice of spectra of the light sources and the method of display driving. This operation enables displays providing a very wide gamut by means of multi-primary color compared to the gamut provided by a display with conventional three RGB primary colors operation.

The new display device can be provided with a multiple color filters and/or optical guides, and a multiplicity of spectra for the light sources. For a display device with n colour filters, and m light sources, with sequentially different spectra, at most n×m primary colours can be made.

Figure 2:
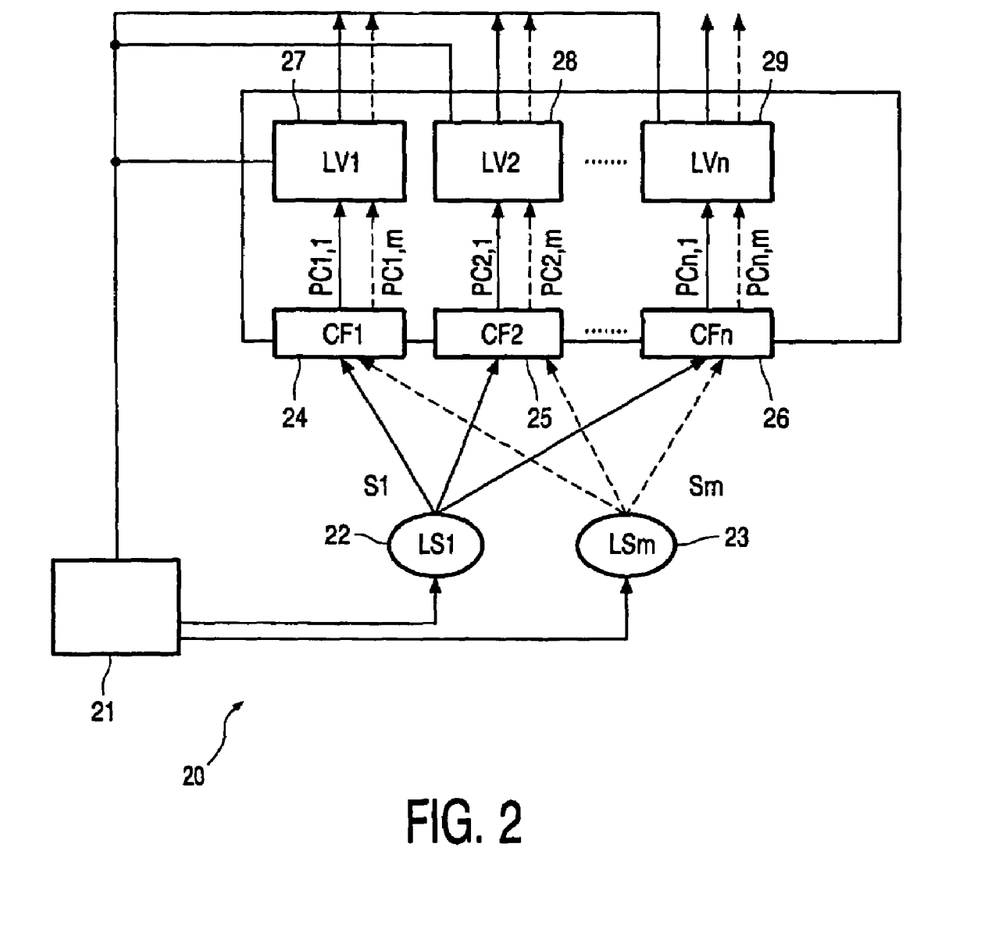
FIG. 2 shows diagrammatically a display device comprising three sub-pixel color filter arrangement and two light sources.

FIG. 2 shows diagrammatically a transmissive display device 20 comprising three color filters 24,25,26, two selectable light sources 22, 23 able to emit light with different spectra, three sub-pixels 27,28,29 of a display and a controller 21. FIG. 2 shows only a single pixel of the display. The light sources 21, 22 can be, for example, a set of one or more light emitting diodes (LED's), cold cathode fluorescent lamps (CCFL) or hot cathode fluorescent lamps (HCFL) with predetermined spectra. In operation, the controller 21 selects alternately one of the light sources 22,23 and drives the sub-pixels 27,28,29 respectively with image information corresponding with the primary colors generated via the color filters 24,25,26 and the selected light source 22,23.

Figure 3:
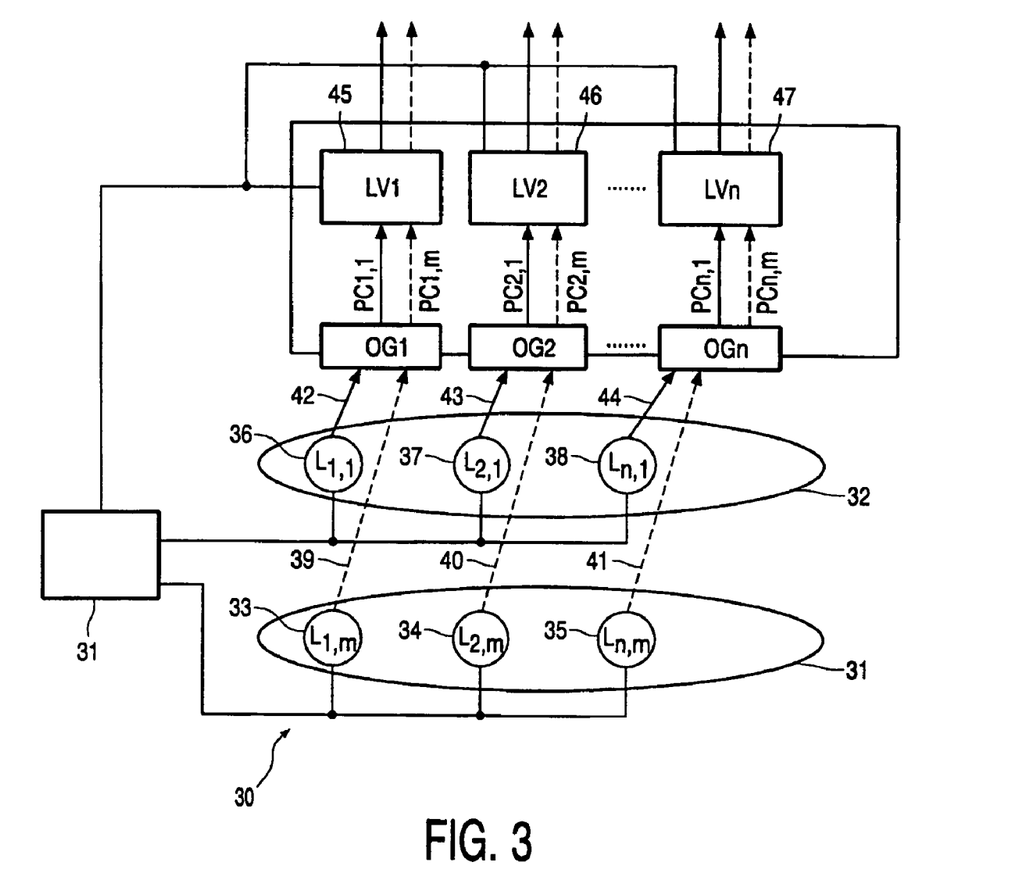
FIG. 3 shows diagrammatically a display device comprising n optical guides and m light sources with different radiance spectra.

A further embodiment of a display device according to the invention the color selection means comprises optical guides and light sources of which the components of the spectra are separately available; for example with a backlight with multiple colour LED's. FIG. 3 shows diagrammatically a transmissive display 30 comprising six optical guides 39,40,41, 42,43,44 and two light sources 31,32 able to emit light with different spectra., respectively. Each light source is composed of a number of LED's 33,34,35;36,37,38 with predetermined spectral components. Together, the spectra of the individual LED's form the complete spectrum of the light source. Instead of mixing these light from the LED's, the light from each LED is kept separated and directed to the proper light valves of a pixel with one the optical guides 39,40,41,42,43, 44. The optical guides can be reused for the spectral components of the other light sources. Combinations of the two variants are also possible. The described principle can be used with other reflective light valves such as digital mirrored display (DMD) panel and liquid crystal on silicon (LCOS) display panels and is in projection displays.

Figure 4:
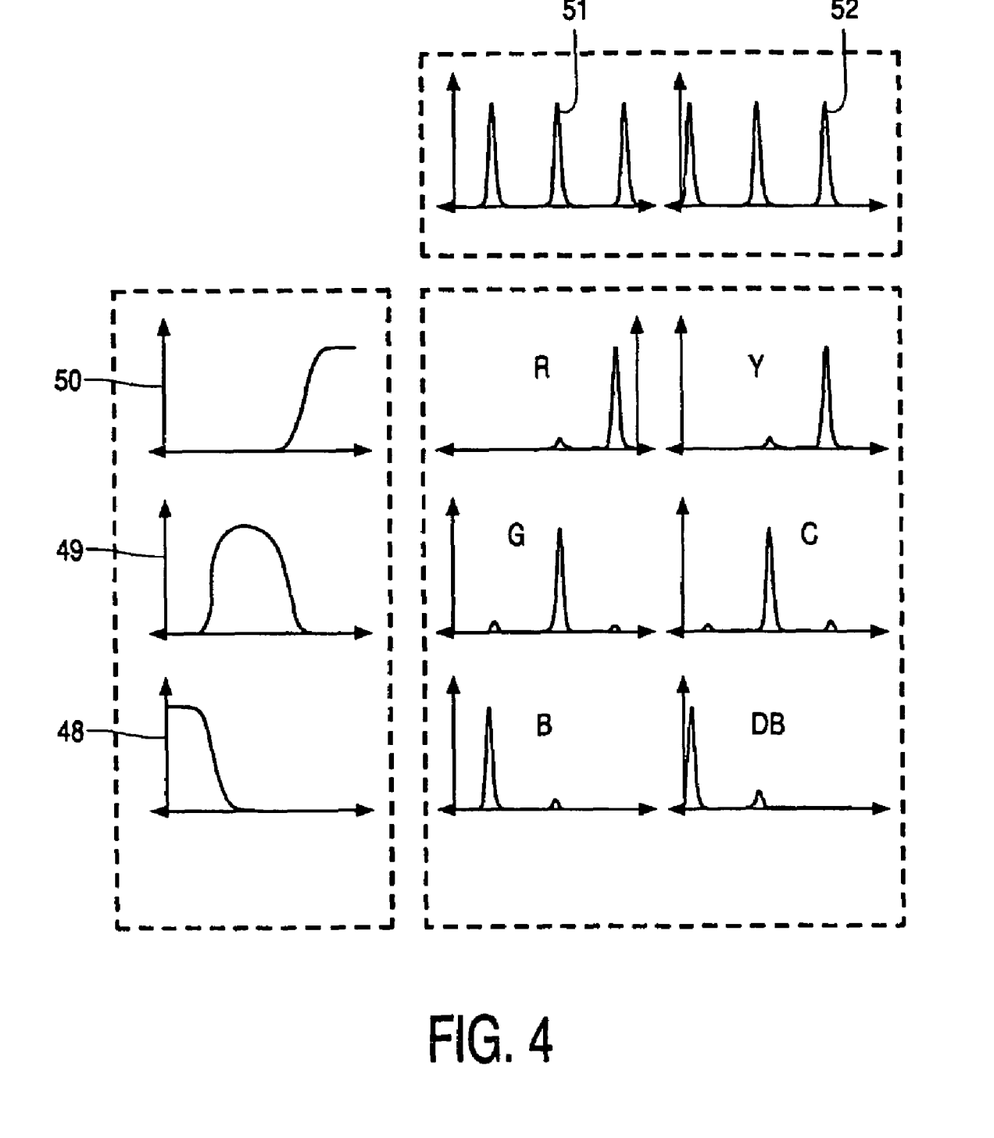
FIG. 4 shows diagrammatically a combination of color filters and spectra of light sources for obtaining a set of predetermined primary colors.
Figure 5:
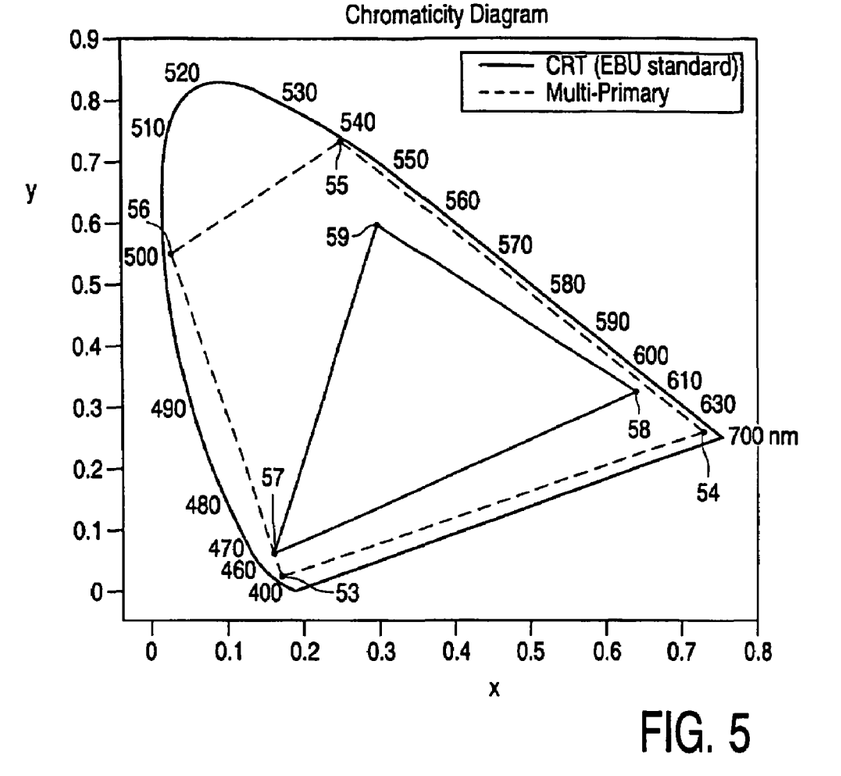
FIG. 5 shows an example of a wide color gamut spawn by four primary colours.

The principle of primary colour selection with colour filters is shown in FIG. 4. FIG. 4 shows a combination of color filters and spectra emitted by the selectable light sources for obtaining a set of predetermined primary colors. The color filters 24,25,26 are conventional red, green and blue color filters having a transmittance spectra 48,49,50 respectively. The first light source 22 is able to emit light with a spectral distribution 51 with three different peaks in the red, green and blue wavelength range respectively. The second light source 23 is able to emit light with a spectral distribution 52 with three different peaks in the yellow, cyan an deep blue wavelength ranges respectively. A deep blue, in this application, means radiation with a wavelength range lower than the conventional blue wavelength range, but still visible. The combination of spectra 51, 52 of the light sources 22,23 and the conventional red, green and blue color filter 24,25,26 yields two sets of primary colors. A first set consisting of red R, green G and blue B; and a second set consisting of yellow Y, cyan C and deep blue DP, respectively. The specific scheme for alternately selecting the first and second light sources 51,52 in combination with driving of the sub-pixels 27,28,29 of the display panel with image data corresponding to the primary colors red R, green, G or blue B of the selected first light source 51 or the primary colors yellow Y, cyan C or deep blue DB of the selected light source 52, enables a wide gamut display device. The color gamut obtained by means of multiple primary colors can be much wider than that of the conventional EBU colour triangle. FIG. 5 shows an example of the gamut of a four primary color display device indicated by the quadrangle 53,54,55,56. and the EBU triangle 57,58,59 for comparison. With a five or six primary color display device, an even wider gamut can be made, or a better trade-off between gamut and available light sources with efficient light spectra can be made.

Figure 6:
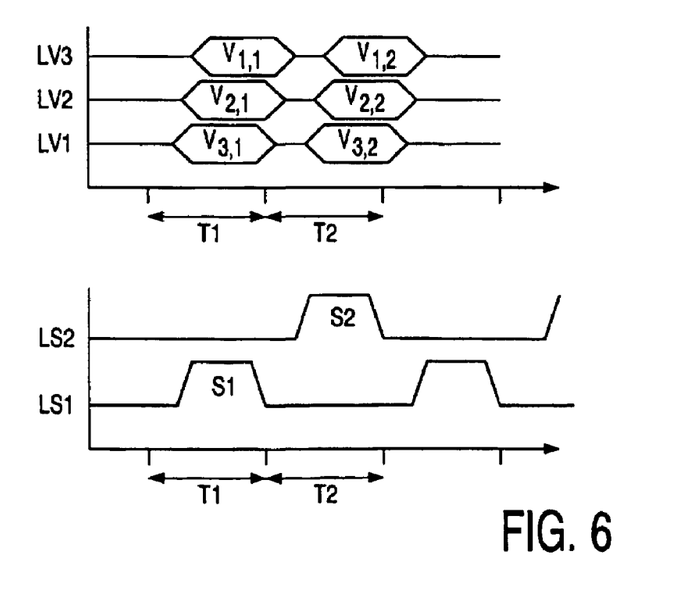
FIG. 6 shows a driving scheme for a spectrum sequential operation of a display device.

FIG. 6 shows diagrammatically the operation of a single pixel of the display device according to this method. Let a conventional image be represented by Y,U and V or red, green or blue information. This information is converted to the proper greylevels for the sub-pixels of the display device. In operation, a frame of an image to be displayed is divided in two periods i.e. subframes T1,T2, wherein a subframe corresponds with a period in which one of the two light sources is driven and emits light with the first or the second spectra. In a subframe T1, one of the light sources LS1,LS2 is selected to illuminate the display panel, and the sub-pixels of a pixel of the display panel are driven with the converted grey levels in correspondence with the sub frame T1 and the selected light source LS1 and to the location of sub-pixel with respect to the arrangement of the color filter. The same sub-pixel is used, in time sequence in the other subframe T2 for modulation of the other primary colours is a similar way.

In general, the sub-pixels LV1,LV2,LV3 are addressed in the first subframe T1 with the grey values $V_{1,1},V_{2,1},V_{3,1}$. In this subframe T1, the pixels of the display device are illuminated by the first light source LS1 and in combination with the colour filters, this results in the selection of the primary colors $P_{1,1},P_{2,1},P_{3,1}$. In the second subframe T2, the sub-pixels LV1, LV2,LV3 of display device are addressed with the grey values $V_{1,2},V_{2,2},V_{3,2}$, and illuminated by the second light source LS2 in combination with the color filters, this results in the selection of the primary colors $P_{1,2},P_{2,2},P_{3,2}$. The driving of the sub-pixels LV1,LV2,LV3 with the grey values V11;V2,1; V31 leads to a weighted contribution of the primary colors.

The colour of the pixel follows from the total weighted sum, given by:

$$\sum_{i=1}^{n}\sum_{j=1}^{m}(p_{i,j} \times V_{i,j})$$

It is advantageous to select the spectra of the light sources to appear "white" in nature, both allow making a white colour, and the white points of the light sources can be chosen close to each other. The controller is arranged to adjust the modulation level of the pixels of the display panel for the primary colors corresponding to subsequent subframes that the perceived different in luminance and/or chrominance is minimized. Alternatively the controller can be adapt to the drive the light sources such that the white points and the luminance of the light sources illuminating the display are equal to each other during subsequent subframes.

The way the light sources illuminate the display panel over time, is in principle a free choice. The driving of the display panel can be combined with the way the light sources illuminate the panel in order to form, for example, a flashing backlight display, a scanning backlight display or a scrolling color display. In a scrolling color display both light sources illuminate different portions of the display panel simultaneously.

Color break-up may occur for color sequential display devices in case distinct primary colors are sequenced. In case an image composed of a moving object with a bright, unsaturated colour is displayed, coloured contours become visible to an observer due to the time sequential appearance of the primary colors. For example, a bright, white object has equal and relatively large contributions of each of the primary colors. In case the eye of the observer watching the display, tracks the motion of the object, and the contributions of the subframes are not motion compensated for the time instance at which they are displayed, the contributions of the subframes become separately visible, and cause the contouring.

In order to reduce color break-up the spectra of the light sources are selected that bright, unsaturated colours can be made with each of the spectra; i.e. with each of the spectra one has the ability to make white, or to come close to making white. With additional video processing, it is possible to select the grey levels $V_{i,j}$ such that a minimum perceived difference is obtained in two subsequent subframes. One way to do this is to try to achieve the closest possible luminance and colour in each the subframes, i.e., for any combination of subframes j and k, to optimise:

$$\forall j,k \; F\left(\sum_{i=1}^{n} V_{i,j} \times p_{i,j}\right) \approx F\left(\sum_{i=1}^{n} V_{i,k} \times p_{i,k}\right),$$

where the function F can be the perceived luminance, chrominance, or combination of both.

Figure 7:
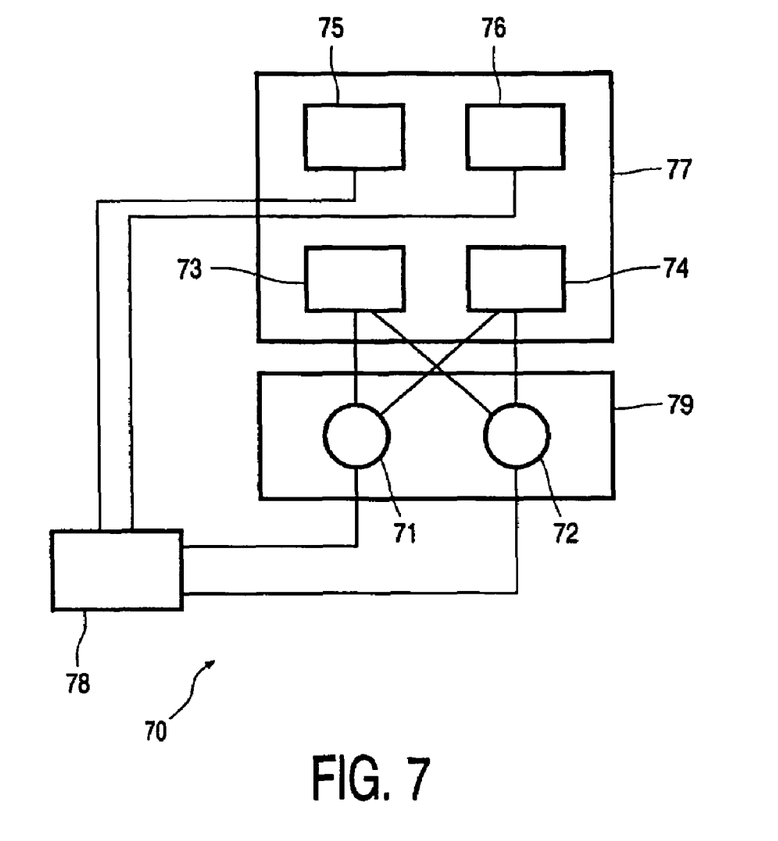
FIG. 7 shows diagrammatically a display device comprising two light source and a two sub-pixel color filter arrangement.
Figure 8:
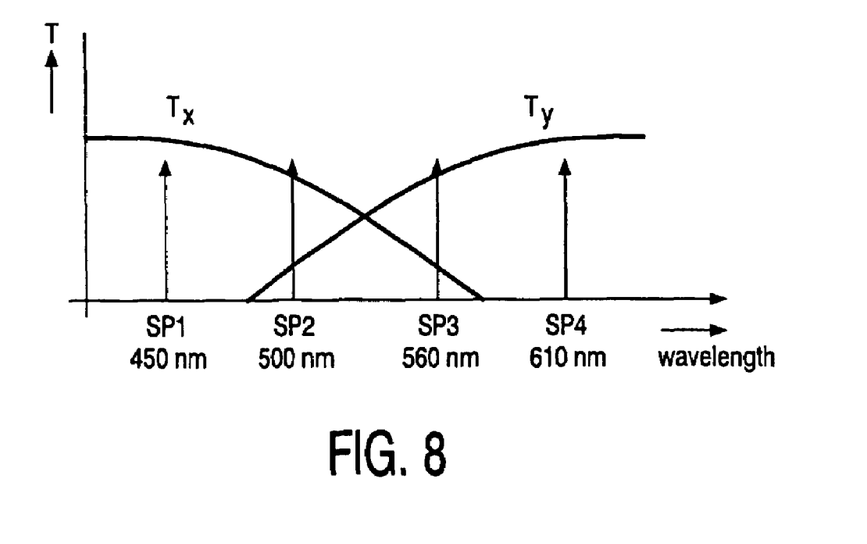
FIG. 8 shows four primary colours obtainable by a first embodiment comprising two colour filters and two light sources.

FIG. 7 shows a further embodiment of the color display device 70 which is provided with a backlight comprising two selectable light sources 71,72 enable to emit light with different spectra, two color filters 73,74 and a display panel 77 and a controller 78. FIG. 8 shows diagrammatically the operation of this display device. Let a conventional image be represented by Y,U and V or red, green or blue information. This information is converted to the proper greylevels for the sub-pixels of the display device. In operation, a frame of an image to be displayed is divided in subsequent periods i.e. subframes T1,T2, wherein the subsequent subframes corresponds with the period in which light having a spectra SP1, SP3;SP2, SP4 respectively is emitted with one of the two light sources. In a subframe, the controller 78 selects one of the light sources 71,72 to illuminate the pixels 75, 76 of the display panel 7 and drives the sub-pixels 75,76 of the display panel 77 with the converted grey levels in correspondence with the primary color obtainable via the spectrum of one the selected lights 71,72 sources and to the proper location of sub-pixel in the color filter arrangement. The same sub-pixel is used, in time sequence, for modulation of different primary colors in subsequent subframes. The controller addresses the pixels 75,76 of the in the first subframe with the grey values $V_{1,1}, V_{2,1}$. In this first subframe, the first light source in illuminate the pixels 75,75 of the display 77. In combination with the color filters this result in the generation of the primary colors $P_{1,1}, P_{2,1}$. In the second subframe, the controller 78 addresses the pixels 75,76 of the display device 77 with the grey values $V_{1,2}, V_{2,2}$, and the second light source illuminate the pixels. 75,75 of the display 77. In combination with the color filters this result in the generation of the primary colors $P_{1,2}, P_{2,2}$. In this embodiment the first radiance spectrum has blue and yellow spectral components SP1,SP3, and the second radiance spectrum has cyan and red components SP2, SP4. The transmissions of the colour filters Tx and Ty have a cross-over between cyan and yellow, the green area respectively.

The first filter having a transmission spectrum Tx transmits blue in subframe 1 and cyan in subframe 2. Likewise, the second filter having a transmission spectrum Ty transmits yellow in subframe 1 and red in subframe 2. Bright, unsaturated colours, close to the white point, can be made with both spectra of the light sources. The backlight 79 comprises for example separately selectable LEDs 71,72. In this embodiment, the color filters 73,74 absorb only half of the light, instead of two-thirds for an RGB solution. This is an increase of 50% in brightness. Furthermore, the colour filters 73,74 is also the most expensive part in direct view LCD, so a reduction of colour filters may result in cost savings.

In this display device 77 only two sub-pixels 75,76 per pixel are needed. This can be used to increase pixel aperture resulting higher brightness or to increase resolution resulting in lower visibility of the pixel structure.

Figure 9:
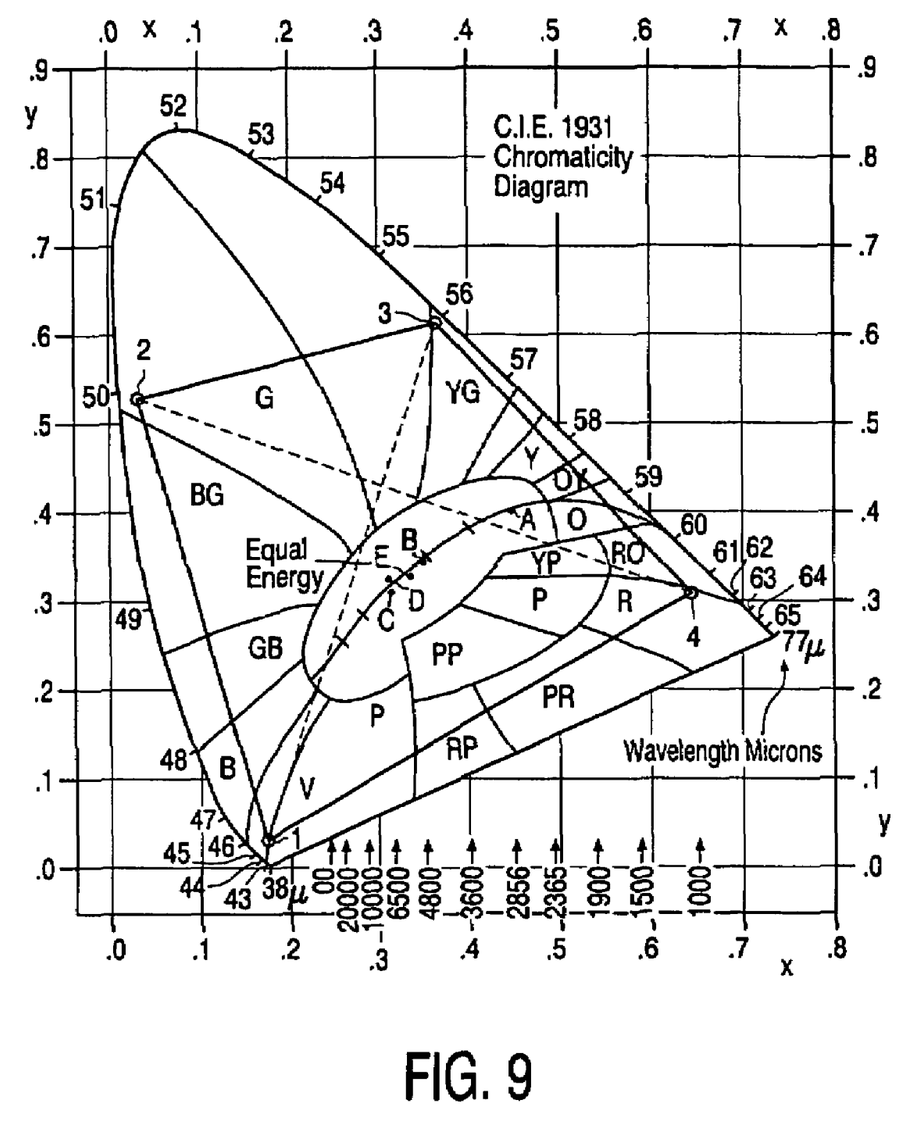
FIG. 9 shows an example of the obtainable colour gamut of the embodiment described with relation to FIG. 7.

The gamut of the four primary colors obtainable with this display device is shown in FIG. 9 and encompasses the EBU colour triangle; so all conventional (RGB) colours can be made.

Figure 10:
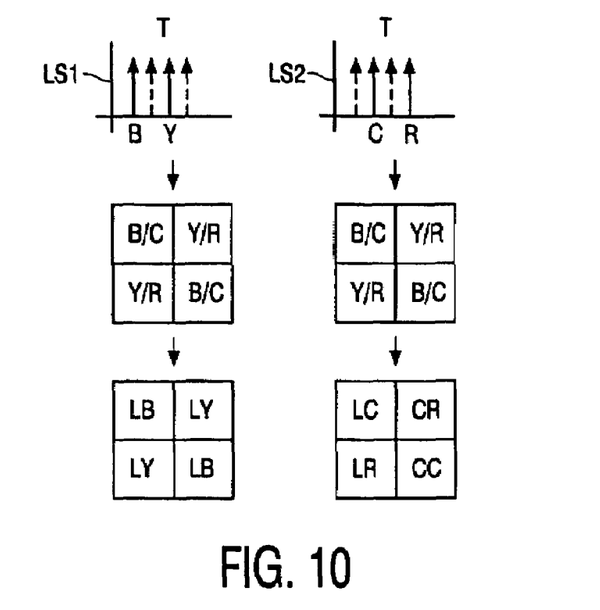
FIG. 10 shows an example of a 2×2 pixel structure.

The display device related to figure FIG. 7 has been emulated on a monitor provided with a color cathode ray tube to investigate the visibility of colour break-up and luminance flicker between the subframes. Note that the extent of the green primary colors could not be achieved. The color filter arrangement as shown in FIG. 10 has been used in the device as described with relation to FIG. 7. Furthermore, FIG. 10 diagrammatically shows the selection of primary colors. In a first subframe T1 the controller 78 selects the light source LS1 emitting light with a spectrum with blue and yellow peaks B,Y the corresponding filters blue-cyan B/C, yellow-red Y/R and yellow-red Y/R, blue-cyan B/C relates to the sub pixels of the displays. The combination of light source LS2 and the filter configuration yields the blue and yellow primary colors LB,LY.

In a second subframe T2 the controller 78 selects the light source LS2 emitting light with a spectrum with cyan and red peaks C,R, the corresponding filters B/C, YR and Y/R, B/C relates to the sub pixels of the displays. The combination of light source LS2 and the filter configuration yields the cyan and red light primary colors LC,LR. This color filter arrangement allows for sub-pixel accurate resolution of white/black lines in both directions.

Experiments have shown that luminance flicker could not be perceived at a 75 Hz subframe rate.

Figure 11:
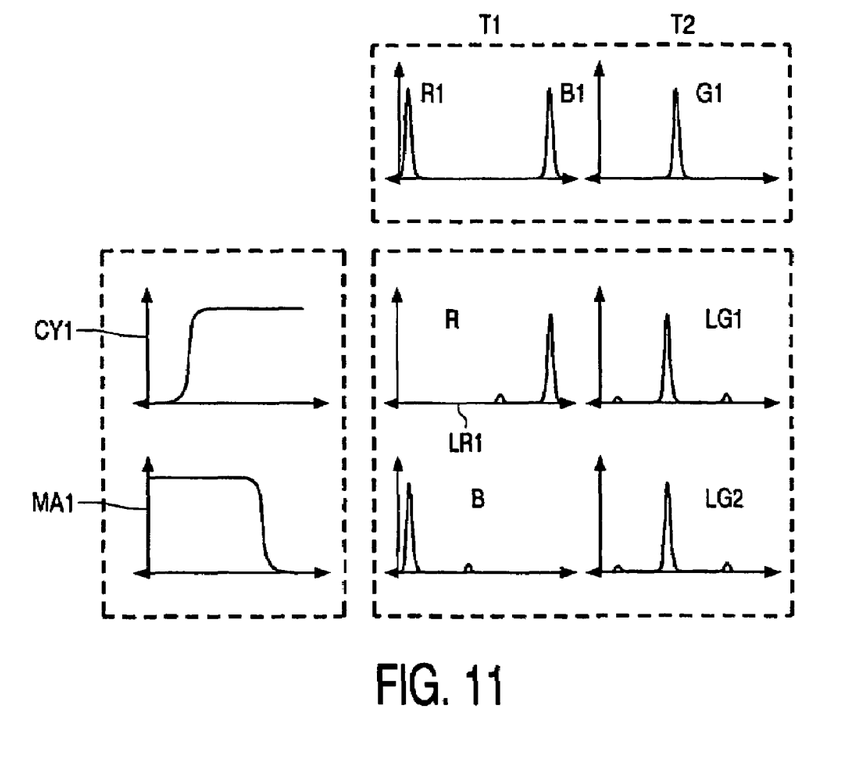
FIG. 11 shows three primary colours obtainable by a second embodiment comprising two color filters and two light sources.

A further embodiment is presented with relation to FIG. 11. This display device related to that embodiment is similar as the display device described with respect to FIG. 7, however the first light source 71 is able to emit light with a spectrum with red and blue peaks R1,b1 and the second light source 72 is able to emit light with a spectrum with a green peak G1. The color filter arrangement has green and magenta portions which transmit light in an overlapping area related to the wavelength range of the spectra of the green peak G1. In a first subframe T1 the controller 78 selects the light source LS1 able to emit light with a spectrum with red and blue peaks RI,BL, the corresponding cyan and magenta color filters CY1 and MA1 relates to the sub pixels of the displays. The combination of light source LS1 and the filter configuration yields the red and blue primary colors LR1,LB1.

In a second subframe T2 the controller 78 selects the light source LS2 able to light with a spectrum with a green peaks G1 .The combination of light source LS2 and the filter configuration yields the green primary color LG1.

This arrangement uses wide overlapping colour filters that both transmit green. In only one of the consecutive subframes the backlight generates green, which transmitted through both sub pixels at the same time.

This arrangement is especially valuable for LED backlights in direct view LCD devices, since the green LEDs do not have a high enough efficiency. Current backlight designs have twice the amount of green LEDs, compared to the other primary colors. This design brings that back to a 1:1:1 proportion. Not that this choice of spectra does not avoid colour break-up.

Figure 12:
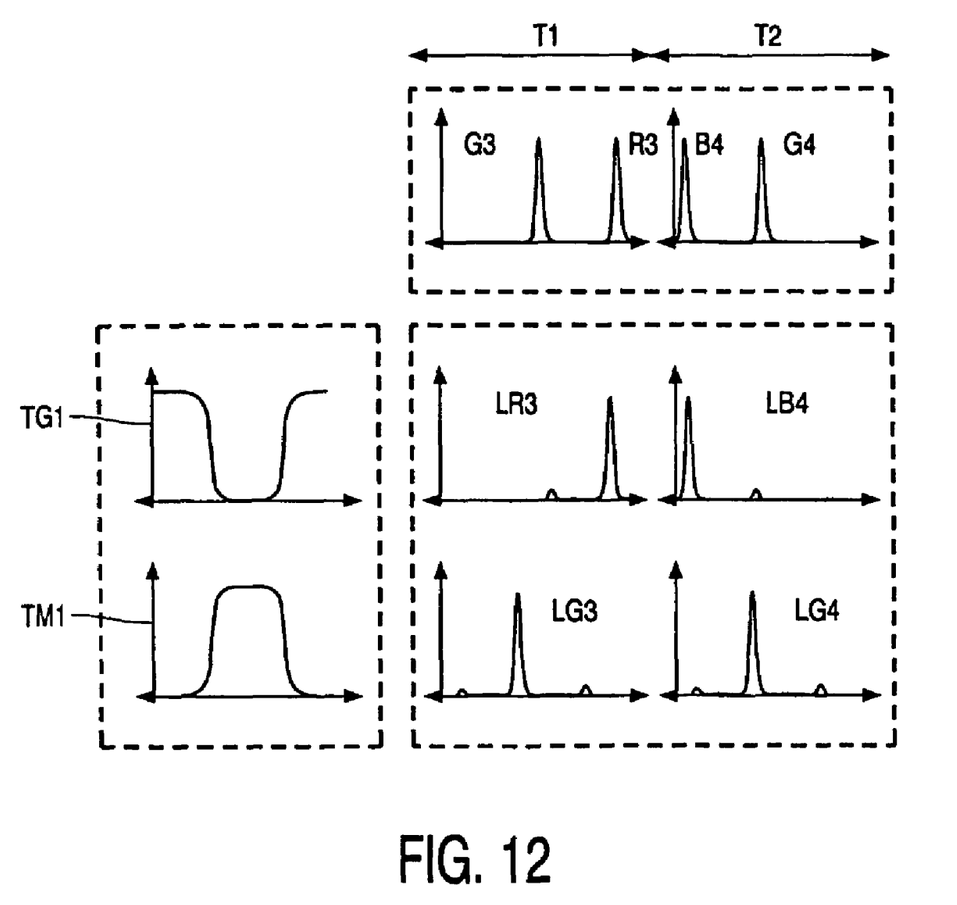
FIG. 12 shows three primary colours obtainable by a third embodiment comprising two color filter and two light sources.

Color break-up can be further reduced in a further embodiment as presented with relation to FIG. 12. This display device related to that embodiment is similar as the display device described with respect to FIG. 7. However the first light source 71 is able to emit light with a spectrum with red and green peaks R3,G3 and the second light source 72 is able to emit light with a spectrum with a blue and green peak B4, G4. The color filter arrangement has green and magenta portions which transmit light in an overlapping area related to the wavelength range of the spectra of the green peaks G3,G4.

This solution is less suitable for boosting, as the green LED is on 100% of the time. All other schemes assume some form of boosting, to compensate for the shorter duty cycle. Boosting in this application means that a LED is pulsed during a short interval with a current higher that a nominal current to increase the light output and maintaining the power consumption and heating below predetermined limits.

A further embodiment is a direct view LCD display device provided with a fluorescent backlight. The backlight is provided with two or more sets of fluorescent lamps for example cold cathode fluorescent lamp, hot cathode fluorescent light, or ceralight. Each set contains lamp types with its own, tuned mix of phosphors to make the proper spectrum. The sets of lamps are flashed in sequence. The LCD panel can be a conventional RGB panel.

Alternatively, the backlight can be provided with two or more sets of LED's. Each set of LED's is chosen such that the proper spectrum is made. For example, a set consisting of red, green and blue LED's and a set consisting of cyan, deep blue and yellow LED's as in the display device as described with relation to FIG. 2. The sets of LED's are flashed in sequence. In further embodiment, the display device can be provided with a dynamic backlight control means wherein the LED's within a set can be varied in brightness, according to the picture content or the display device can be provided with dynamic spectrum control means wherein the choice of LED's that make up a set with a specific spectrum can be chosen dynamically, according to picture content.

In further embodiments a dedicated 2-colour filter design is applied instead of a conventional RGB colour filter panel. This can be a two sub field, 4 primary color solution as proposed in the text, a two sub field, 3 primary color solution as proposed in the text, or a three sub field, 6 primary color solution.

For darker, unsaturated colors, which can not be made in all of the spectra, some luminance flicker might occur, but no color break-up. This is also less visible, since the luminance is not as high. Experiments have shown that this luminance flicker disappears at 75 Hz frame-rate. In the above described embodiments a reflective light valve panel such as LCD, LCoS, DMD instead of the transmissive LCD can be applied.

In display devices provided with reflective light valve display panels, a front light system is provided with the light sources. For example, the CCFL, HCFL or LEDs.

Furthermore, the display device can be provided with a transflective display panel with colour filters and spectrum sequential light source, This display device provided with a backlight improves on color gamut whereas the low-power reflective mode benefits from the spectral width of the color filters with respect to brightness.

In a further example, the display device can be provided with a scattering display panel with colour filters and spectrum sequential light sources, wherein the scattering display panel is based on light scattering optical switches for example a scattering light guide.

In examples of display devices as described above with light source having different separated spectra, and without colour filters, optical light guides can take care of delivering the right primary color to the right sub-pixel.

Furthermore, the display device can be combined with a spatial-temporally modulated backlight, where the spectrum, colour, and brightness of the backlight can be controlled on a segment basis, according to picture information.

The advantages of the proposed display devices are the following:

The display device substantially reduces the colour break-up. This is especially so for high brightness unsaturated colours, which normally do cause the break-up problems with current colour sequential displays.

A wider gamut can be attained with a display device with conventional RGB or three primary colors.

The display device can be realised with a conventional LCD panel provided with a conventional mosaic filter for obtaining red, green and blue, so little modifications need to be made to the LCD panel.

In case of bright ambient light conditions the colour sequential switching can be switched off such that the display device is illuminated by all light sources at the same time. Because of the presence of the colour filters the colour gamut falls back to the present level but with a high luminance.

A lower cost can be achieved with a two colour filter solution. The fabrication process is simplified.

A higher pixel aperture can be achieved with a two colour filter solution. Less area is taken up by TFT (thin film transistor, in the active matrix) and wiring for an active matrix LCD, due to less sub-pixels per pixel. This leads to a higher overall brightness.

As a consequence of the above, also a higher resolution can be achieved with a two colour filter solution.

Less light is held back with a two colour filter solution. Only 50% of the light is absorbed by the colour filters, compared to 33% for regular RGB filters. This also leads to a 50% increase in overall brightness.

Further advantageous embodiments of display system comprises two separately selectable light sources, a display panel and a control panel as described with relation to FIG. 2 and one of three sub pixel filter arrangement shown in FIGS. 13, 14, 15 or 16. In these display systems the first light source is able to emit light having a spectral distribution with peaks centered around the red and cyan wavelength ranges respectively, and the second light source is able to emit light having a spectral distribution with peaks in the yellow-green and blue wavelength ranges respectively. For example, the peaks of the spectral distributions of the first light source are centered around 610 nm and 500 nm respectively, and the peaks of the spectral distribution of the second light source are centered around 560 nm and 450 nm respectively. A controller alternately selects one of the light sources in correspondence with the displayed sequential image data as explained with the description of FIGS. 6 and 7. The backlight controller can also drive the intensity of the sequentially selected light sources such that the intensity and white point of the radiation passed by the white filter is equal. This has the advantage that color break-up and flicker will be reduced.

Figure 13:
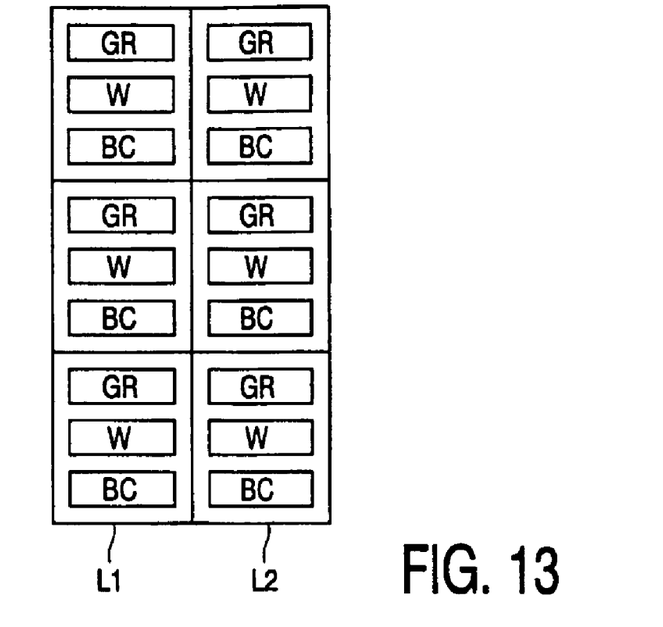
FIGS. 13-16 show various example of color filter arrangement of the display device.

FIG. 13 shows a stripe filter arrangement wherein each line L1, L2 consists of adjacent triplets of a blue-cyan BC filter, a white filter W and green-red filter GR, wherein the blue-cyan filter BC transmits the blue-cyan portion of the spectrum of the light sources, the white filter W transmits the full spectrum of the light sources and the green-red filter GR transmits the green-red portion of the spectrum of the light sources.

Figure 14:
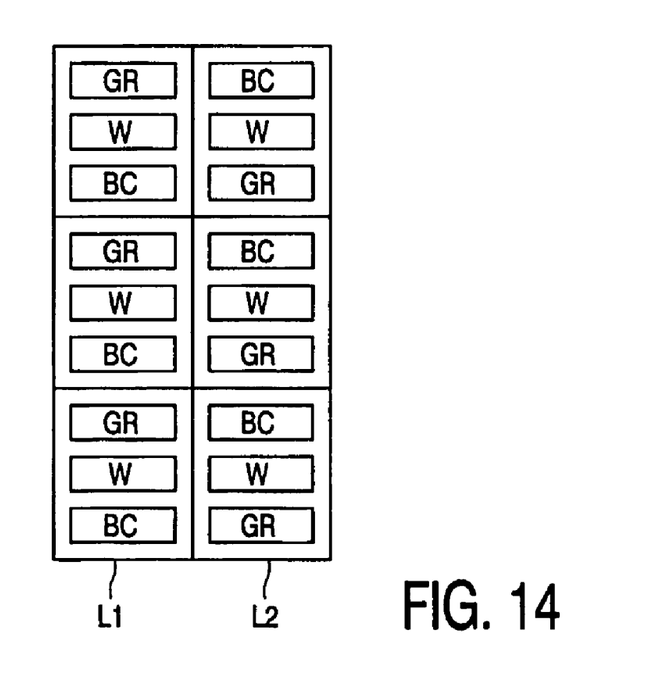

FIG. 14 shows a stripe filter arrangement wherein each line L1,L2 consists of consecutive triplets of similar filters as the arrangement shown in FIG. 12, however the position of the blue-cyan filter BC and the green-red filter GR in the triplets of line L1 are interchanged with respect to the position of the blue-cyan filter BC and the green-red filter GR of the consecutive line L2.

These two filter configurations have the advantage that they can be manufactured in conventional stripe filter processes.

Figure 15:
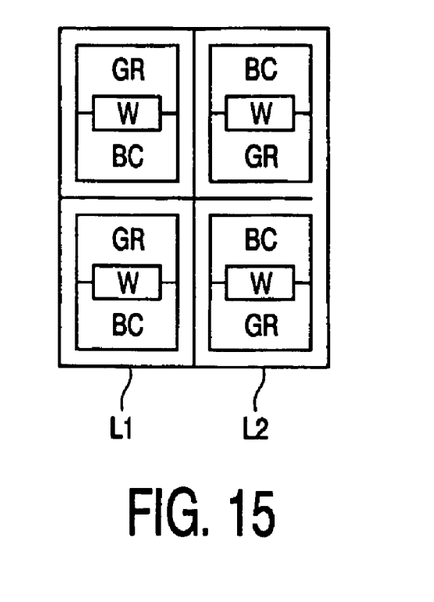

FIG. 15 shows a filter arrangement wherein each line L1,L2 consists of adjacent triplets of a blue-cyan BC filter, a white filter W and green-red filter GR and wherein the green-red filter GR and the blue-cyan filter BC meet each other and together enclose the white filter W. The area of the white filter is smaller than that of the green-red filter GR and the blue-cyan filter BC respectively.

Figure 16:
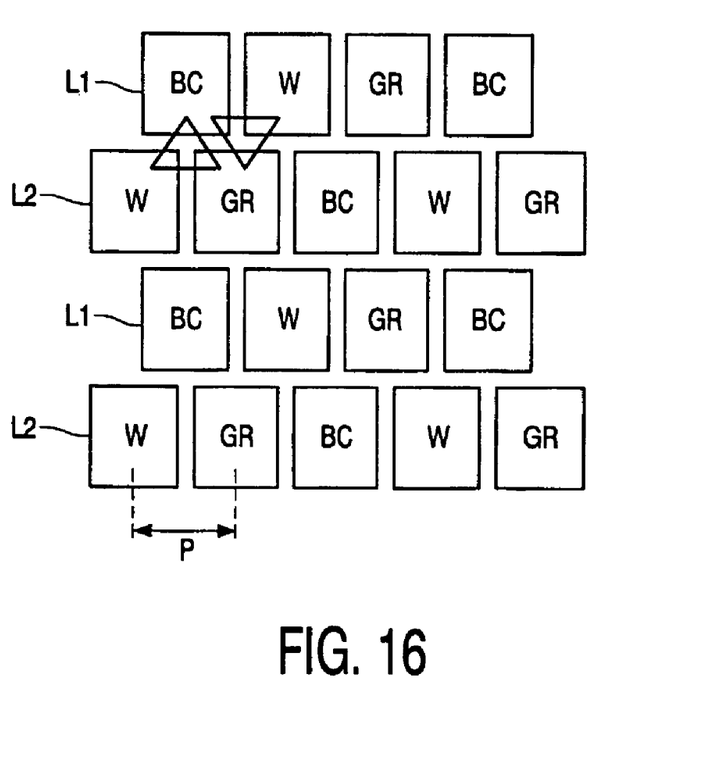

FIG. 16 shows a delta-nabla filter arrangement consisting of alternating first and second lines L1,L2 having consecutive triplets of a blue-cyan filter BC, white filter W and blue-cyan filter BC. In each first and second line L1,L2 the pitch P represents the distance between the centers of two consecutive filters in the triplets on the line. In this arrangement the triplets of the first lines L1 are displaced with a distance 1.5 P with respect to triplets of the second lines L2 adjacent to the first lines L1.

The advantage of this filter configuration is that a conventional manufacturing process can be used. Furthermore, a conventional active matrix driving plane can be applied to manufacture the display device. A further advantage of the delta-nabla filter arrangement is that a higher resolution for luminance can be obtained when suitable scaling algorithms for the image data.

A further advantage of these filter configuration is that a theoretical 200% improvement in brightness can be achieved. This gain in brightness can be exchanged for a reduction in power of the backlight.

In order to reduce color or chrominance flicker between consecutive subframes in these type of sequential display devices an optimization of the driving can be according to the following method.

Let the color of the pixel c be defined in XYZ space as:

$$c = \begin{bmatrix} X \\ Y \\ Z \end{bmatrix}$$

If the image representation is in another space for example as RGB, this representation can be transformed to XYZ with a conventional 3×3 matrix multiplication.

The multi-primary color drive vector p is given by:

$$p = \begin{bmatrix} p_a \\ p_b \\ p_c \\ p_d \\ p_e \\ p_f \end{bmatrix} = \begin{bmatrix} p^A \\ p^B \end{bmatrix}$$

The partition of this drive vector p is into a first and second set ($P^A$, $p^B$) for the subframes. The drive values are constrained between zero (full off, minimum light) and one (full on, maximum light): $0 \leq p_x \leq 1$.

The color point of the primary colors are collected in the transformation matrix T, as given by:

$$T = \begin{bmatrix} X_a & X_b & X_c & X_d & X_e & X_f \\ Y_a & Y_b & Y_c & Y_d & Y_e & Y_f \\ Z_a & Z_b & Z_c & Z_d & Z_e & Z_f \end{bmatrix} = [\, T^A \quad T^B \,]$$

Again, the partitioning into two sets ($T^A$, $T^B$) is for the two consecutive subframes.

The drive vector p satisfies the color equation:

$$c = T \cdot p + \epsilon$$

wherein c represent a color to be displayed, T represents the transformation matrix and p represent the drive vector and $\epsilon$ represents the error in color representation. For colors within the gamut, the error $\epsilon$ in representation is zero. For colors outside of what is representable with the gamut, the error may be minimized with a known gamut mapping technique.

Furthermore, the color c can be partitioned over the two subframes as $c^A$ and $c^B$, given by:

$$c^A = T^A \cdot p^A + \epsilon^A; \quad c^B = T^B \cdot p^B + \epsilon^B;$$

$$c = c^A + c^B$$

For least annoyance from a perceptive point-of-view, the colors $c^A$, $c^B$ shown in both subframes should be substantially equal, in luminance and chrominance.

$$c^A \cong c^B \cong \frac{1}{2} c$$

This condition avoids flicker due to differences in the subframes, which becomes annoying at higher brightness. This condition also avoids color break-up or the color flash effect as known artifacts due to color sequential operation of the display device.

Clearly, this is not possible for all colors, since the individual gamuts for the spectra are not the same. If they would be, then there would be no gain in the spectrum sequential approach. Nevertheless, for a large portion of the colors, the gamuts overlap.

Figure 17:
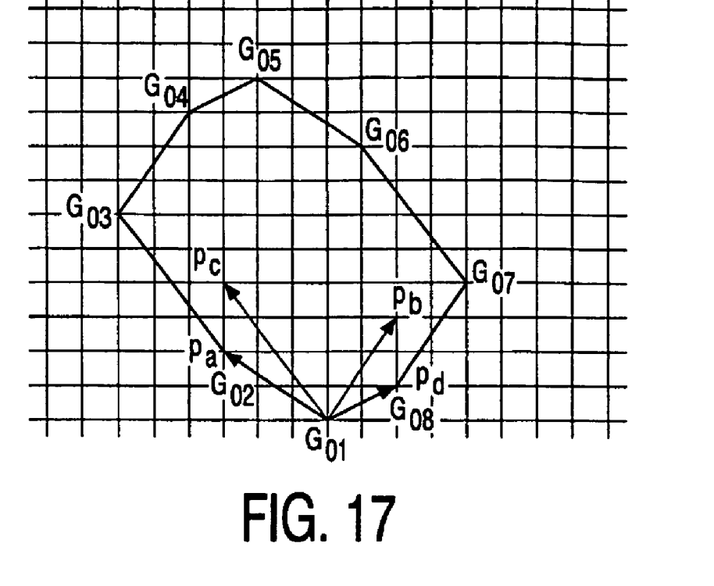
FIG. 17 shows a color gamut obtainable by a display system comprising two selectable light sources and two color filters for a set of primary colors, FIG. 18 show a color gamut that can be made with equal chromance and luminance in two subsequent subframes for a set of primary colors.

FIG. 17 shows a color gamut obtainable by a display system comprising two selectable light sources and two color filters as described in relation to FIG. 7. The color gamut is shown in a fictitious 2D color space. A luminance related to the primary colors is shown on the vertical axis.

The vectors $P_a$ and $p_b$ are the predetermined primary colors for spectrum 1, and $P_c$, $P_d$ are the predetermined primary colors for spectrum 2. The vector represents the color point of a primary color at full drive of the corresponding sub-pixel of the display. The polygon G01,G02,G03,G04,G05;G06;G07; G08 is the polytope of the gamut that can be made with this display system.

Figure 18:
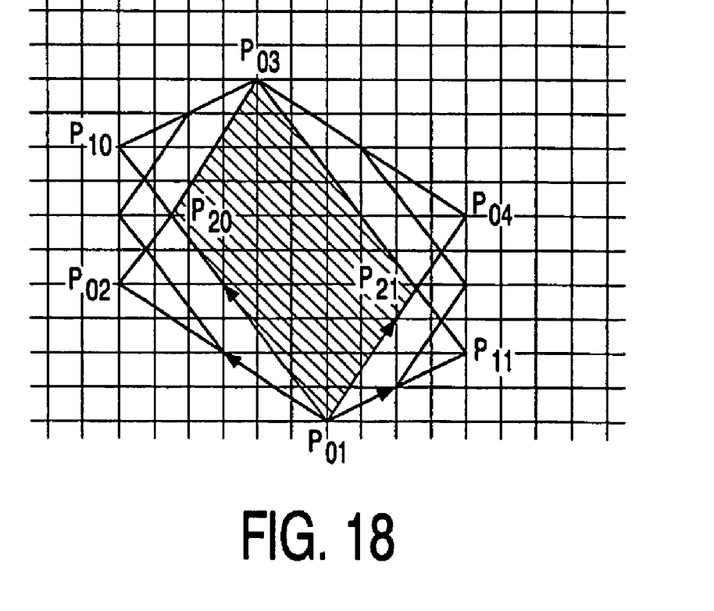

FIG. 18 shows an example of a color gamut which can be made with both spectra of the two light sources respectively for obtaining the predetermined set of colors $P_a, P_b, P_c$ and $P_d$. The white-point of both spectra is the same, in chrominance and in luminance. This is important for large overlap, and a maximal reduction of flicker for maximum white, where it is the most visible. The bounding boxes P01,P02,P03,P04; P01, P10,P03,P11 respectively, show the gamuts which can be achieved with the individual spectra 1 and 2. The shaded box P01,P20,P03,P21 which is their intersection, shows the polytope of the gamut which can be achieved with equal luminance and chrominance in both spectra.

A color transformation matrix S to compute the difference between $c^A$ and $c^B$, which is given by:

$$S = \begin{bmatrix} X_a & X_b & X_c \\ Y_a & Y_b & Y_c \\ Z_a & Z_b & Z_c \end{bmatrix} \begin{bmatrix} -X_d & -X_e & -X_f \\ -Y_d & -Y_e & -Y_f \\ -Z_d & -Z_e & -Z_f \end{bmatrix}$$

and define the difference d as:

$$d = \begin{bmatrix} \Delta X \\ \Delta Y \\ \Delta Z \end{bmatrix}; \quad d = S \cdot p; \quad d = c^A - c^B$$

If it is not possible to attain equal luminance and chrominance, then equal luminance is preferred, allowing for a minimized error in chrominance, since the human visual system is less susceptible to the latter. This minimization still avoids luminance flicker between the subframes. With minimized error in chrominance, the color break-up is at a substantial low level.

Figure 19:
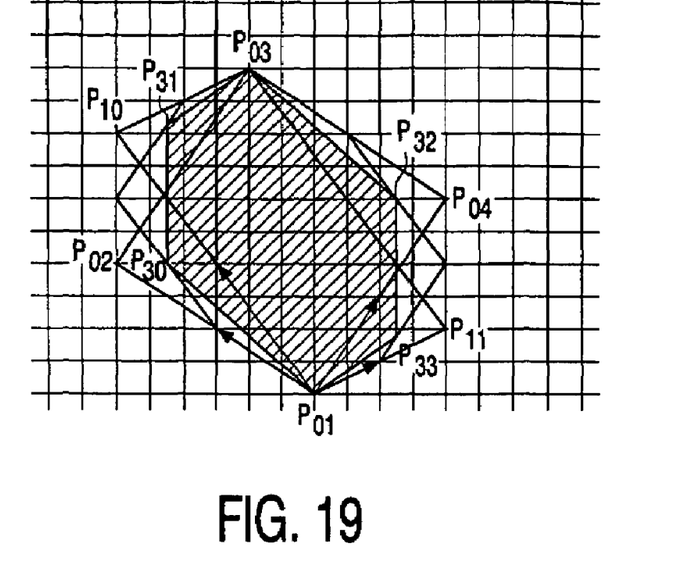
FIG. 19 shows a color gamut that can be made with equal luminance in two subsequent subframes for a set of primary colors.

FIG. 19 shows a polygon P01,P30,P31,P03,P32,P33 indicating a gamut of colors that can be made with equal luminance in two subsequent subframes for the same set of primary colors $P_a, P_b, P_c$ and $P_d$.

Finally, if equal luminance is also not possible, then this condition is abandoned, and the error in luminance and chrominance between the two subframes is minimized.

Figure 20:
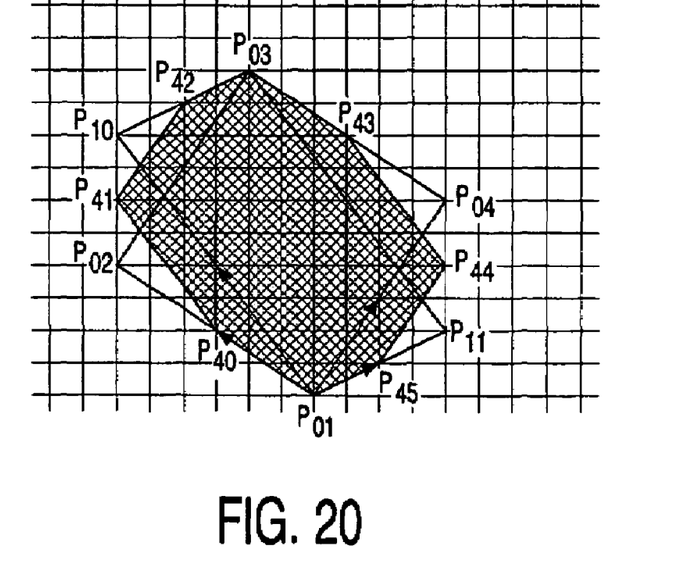
FIG. 20 shows an entire color gamut of in both subframes for a set of primary colors.

FIG. 20 shows a polygon P01,P40,P41,P42,P03,P43,P44, P45 indicating an entire gamut in both subframes for the same set of primary colors $P_a, P_b, P_c$ and $P_d$ for reference. The difference between the polygon P01,P40,P41,P42,P03,P43, P44,P45 and the equal-luminance gamut indicated by the polygon P01,P30,P31,P03,P32,P33 is minimal. Differences may occur when highly saturated primary colors are required. This has little effect on flicker and/or color break-up since this occurs for colors that do not have high brightness.

In summary, for the reduction of color break up first the condition of equal chrominance and equal luminance in subsequent sub frames is pursued by selecting the proper colors, if that is not possible the condition of equal luminance an minimal error in chrominance in subsequent sub frames is pursued and if that is not possible the errors for chrominance and luminance in subsequent sub frames is pursued.

Furthermore, the sequential operation requires a display panel with fast response time, to avoid flicker. Initial experiments have shown that a 75 Hz frame rate is acceptable, with no visible luminance flicker for highly saturated colours that occur in only one of the subframes. This is, however, still far lower than what is required for pure colour sequential operation (150-180 Hz for RGB or 250-300 Hz for 5 primary colors).

The multi-primary color nature of the display device requires display processing, where YUV or RGB representation of images must be converted to the proper grey level drive values for each of the primary colors.

For example as is disclosed in the cited WO 01/95544.

The invention relates to a wide color gamut display device comprising a light valve display panel, illumination means for providing an light beam for illuminating the light valve display panel and control means for time sequentially and spatial sequentially controlling the spectrum of the light beam. The primary colours of the display device can be selected in a time sequential and space sequential way which enable a reduction of a color break-up. This kind of display device has an advantage of being able to display a wider gamut at high brightness levels than a three-primary color (RGB) display. This display device provides a wide colour gamut, with high brightness and low cost options. This is achieved by means of a transmissive, transflective, or reflective display panel with an active backlight, which is controlled in spectrum and colour, and can cycle through this at a moderate high frame-rate. The display primary colors are selected both spatially, for example by colour filters and/or optics and temporally for example spectrum sequential. The sequential operation does not lead to colour break-up. The proposed display can attain a wide gamut, even with a conventional RGB LCD panel without any modifications to the panel, but only to the backlight.

It will be obvious that many variations are possible within the scope of the invention without departing from the scope of the appended claims.

The invention claimed is:

1. A color display device for displaying a color image, comprising:
   a display panel provided with a plurality of picture elements,
   at least two selectable light sources having different predetermined radiance spectra, each of said spectra having a plurality of peaks at different desired wavelengths,
   a color selection means which in combination with the selectable light sources is able to produce primary colors on the display panel,
   control means arranged to select alternately one of the selectable lightsources during a first and second period respectively and to provide a portion of the picture elements with image information corresponding to the primary color obtainable with the selected light source,
   wherein the color selection means comprises a filter arrangement comprising a number of lines, each line comprising consecutive triplets of a blue-cyan filter, a white filter and a green-red filter, wherein the blue-cyan filter has a pass band for the blue-cyan portion of the spectrum of the radiation, the white filter has a pass band for the visible portion of the spectrum of the radiation and the green-red filter has a pass band for the green-red portion of the spectrum of the radiation.

2. A color display device as claimed in claim 1 wherein the color selection means comprises at least two color filters having predetermined transmittance spectra which in combination with each of the radiance spectra of the selectable light sources yields a first group of primary colors obtainable by selecting the first light source and a second group of primary colors obtainable by selecting the second light source.

3. A color display device as claim in claim 2 wherein each color filter is associated with a portion of the picture elements and the control means being arranged, during a first period, to select the first light source and to provide the respective portions of the picture elements associated with the respective color filters with image information corresponding to respective primary colors of the first group and during a second period, to select the second light source and to provide the respective portions of pixel elements associated with the respective color filters with image information corresponding to respective primary colors of the second group.

4. A color display device as claim in claim 2 wherein the first group of primary colors contains red and green and the second group of primary colors contains green and blue.

5. A color display device as claimed in claim 2 wherein the first group of primary colors contains blue and yellow and the second group of primary colors contains cyan and red.

6. A color display device as claimed in claim 1 wherein the first light source is able to emit radiation having a spectral distribution having peaks centered around the red and cyan wavelength ranges respectively and the second light source is able to emit radiation having a spectral distribution having peaks centered around the green-red and blue wavelength.

7. A color display device as claimed in claim 1 wherein the positions of the blue-cyan filter and the green-red filter respectively in the triplets of a first line are interchanged with respect to the positions of the blue-cyan filter and the green-red filter respectively in the triplets of a second line consecutive to the first line.

8. A color display device as claimed in claim 1 wherein a line comprises consecutive triplets wherein the green-red filter and blue-cyan filter meet each other and together enclose the white filter.

9. A color display device as claimed in claim 1 wherein the pitch P represents the distance between the centers of two consecutive filters in the triplet, and the triplets of a first line are displaced with a distance of 1.5 times the pitch P with respect to triplets of a second line, consecutive to the first line.

10. A color display device as claimed in claim 2 wherein the color selection means comprises three color filters and the first group of primary colors contains red, green and blue and the second group of primary colors contains cyan, deep blue and yellow.

11. A color display device as claimed in claim 1 wherein the color selection means comprises a lightguide for guiding the light from one of the light source to the portion of the display elements corresponding to one of the primary colors.

12. A color display device as claimed in claim 1 wherein the light sources comprise fluorescent lamps or light emitting diodes.

13. A color display device for displaying a color image, comprising:
   a display panel provided with a plurality of picture elements,
   at least two selectable light sources having different predetermined radiance spectra, each of said spectra having a plurality of peaks at different desired wavelengths,
   a color selection means which in combination with the selectable light sources is able to produce primary colors on the display panel,
   control means arranged to select alternately one of the selectable light sources during a first and second period respectively and to provide a portion of the picture elements with image information corresponding to the primary color obtainable with the selected light source,
   wherein the color selection means comprises at least two color filters having predetermined transmittance spectra which in combination with each of the radiance spectra of the selectable light sources yields a first group of primary colors obtainable by selecting the first light source and a second group of primary colors obtainable by selecting the second light source,
   wherein each color filter is associated with a portion of the picture elements and the control means being arranged, during a first period, to select the first light source and to provide the respective portions of the picture elements associated with the respective color filters with image information corresponding to respective primary colors of the first group and
   during a second period, to select the second light source and to provide the respective portions of pixel elements associated with the respective color filters with image information corresponding to respective primary colors of the second group, and
   wherein the primary colors of the first group combined together form substantially white and the primary colors of the second group combined together form substantially white and the control means are arranged to adjust a modulation level of the display panel for the primary colors corresponding to the two subsequent periods that the perceived difference in luminance and/or chrominance in the two subsequent periods is minimized.

14. A color display device as claimed in claim 13 wherein the control means are arranged to adjust a modulation level of the display panel so as to minimize the perceived difference in luminance and/or chrominance of the obtained primary colors corresponding to the two subsequent periods is minimized.

15. A color display device as claimed in claim 13 wherein the control means are arranged to adjust the brightness levels of the sequentially selected light source so as to minimize a measured difference in luminance and/or chrominance of illumination of the display panel corresponding to the two subsequent periods.

16. A method of operating a color display device for displaying a color image, comprising the steps of:
   generating light having different predetermined radiance spectra in subsequent first and second periods, each of said spectra having a plurality of peaks at different desired wavelengths,
   filtering the generated light from the selected light sources for generating primary colors on the display panel during the subsequent periods, and
   providing image information corresponding to the primary colors related to the subsequent periods to portions of the color display panel,
   wherein the filtering step is performed by a filter arrangement comprising a number of lines, each line comprising consecutive triplets of a blue-cyan filter, a white filter and a green-red filter, wherein the blue-cyan filter has a pass band for the blue-cyan portion of the spectrum of the radiation, the white filter has a pass band for the visible portion of the spectrum of the radiation and the green-red filter has a pass band for the green-red portion of the spectrum of the radiation.

* * * * *